United States Patent [19]

Hadley

[11] Patent Number: 5,172,477
[45] Date of Patent: Dec. 22, 1992

[54] METHOD OF PRODUCING A FLEXIBLE HOSE ASSEMBLY FOR A MANOMETER MERCURY LINE

[76] Inventor: Benjamin H. Hadley, 692 W. 9th St., Claremont, Calif. 91711

[21] Appl. No.: 763,311

[22] Filed: Sep. 20, 1991

Related U.S. Application Data

[62] Division of Ser. No. 461,820, Jan. 8, 1990, Pat. No. 5,069,253.

[51] Int. Cl.⁵ .............................................. B23K 31/02
[52] U.S. Cl. .................................. 29/890.144; 29/446; 29/454; 29/469; 228/182; 228/154
[58] Field of Search .............. 29/890.144, 454, 469, 29/446; 228/182, 154

[56] References Cited

U.S. PATENT DOCUMENTS

| | | | |
|---|---|---|---|
| 2,216,468 | 10/1940 | Farrar | 29/454 |
| 2,300,547 | 11/1942 | Guarnaschelli | 29/454 |
| 2,934,095 | 4/1960 | Lockhart | 29/454 |
| 3,023,496 | 3/1962 | Millar | 228/182 |
| 3,307,589 | 3/1967 | Sheffield | 138/109 |
| 4,089,351 | 5/1978 | Ward et al. | 138/109 |
| 4,527,819 | 7/1985 | Desilets et al. | 228/154 |

*Primary Examiner*—Mark Rosenbaum
*Assistant Examiner*—David P. Bryant
*Attorney, Agent, or Firm*—Harris, Kern, Wallen & Tinsley

[57] ABSTRACT

A flexible hose assembly for a mercury line for a manometer, and including a length of convoluted hose having an end, an inner sleeve positioned over the hose and having an end welded to the hose end, a hose fitting having an end and a welding section spaced from the end with the fitting end welded to the inner sleeve, a braid positioned over the hose and inner sleeve, and an outer sleeve positioned over the braid and having an end welded to the braid end and to the fitting at the welding section. A method of producing such a hose assembly.

3 Claims, 2 Drawing Sheets

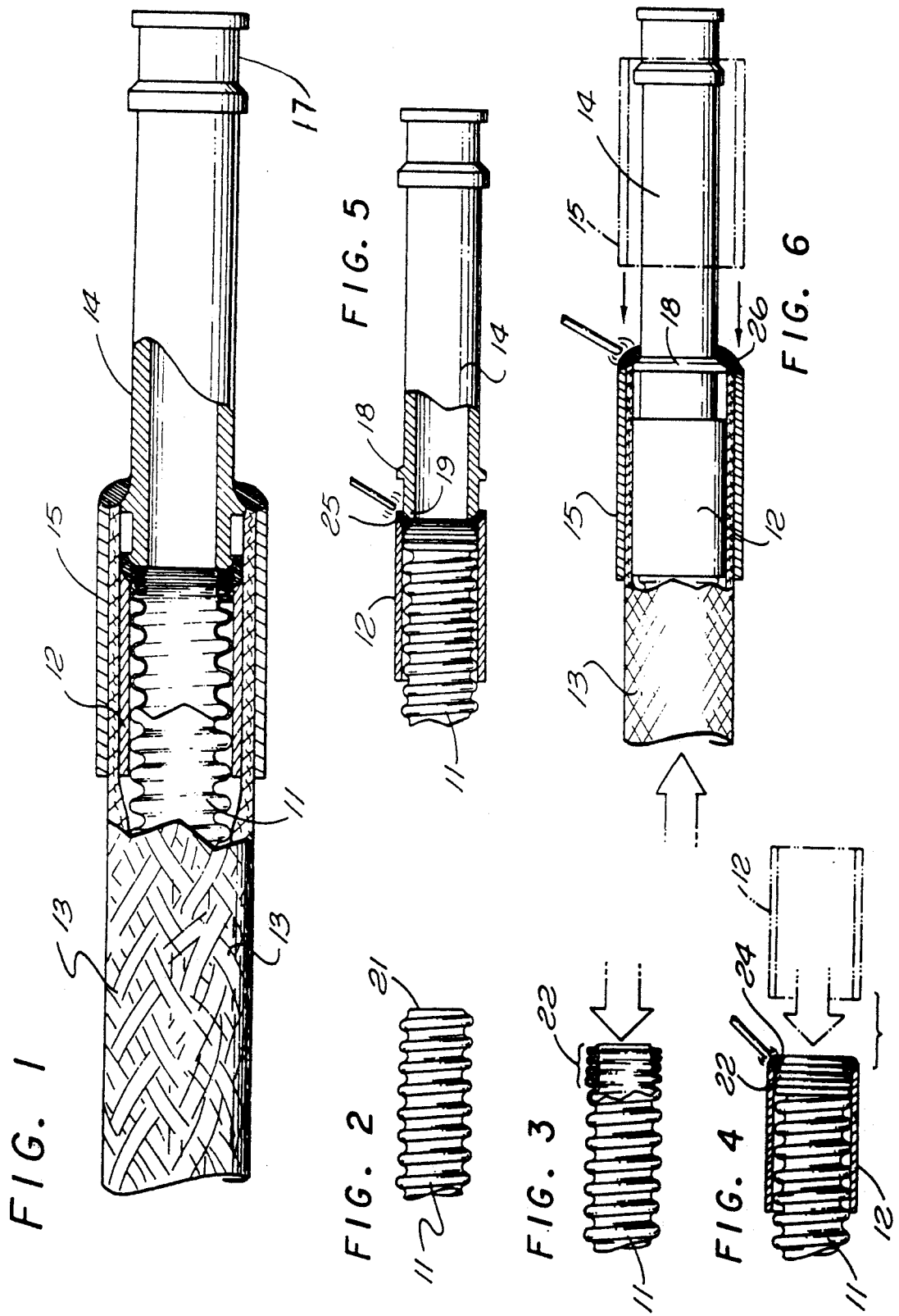

METHOD OF PRODUCING A FLEXIBLE HOSE ASSEMBLY FOR A MANOMETER MERCURY LINE

This application is a division of application Ser. No. 07/461,820, filed Jan. 8, 1990, now U.S. Pat. No. 5,069,253.

BACKGROUND OF THE INVENTION

This invention relates to flexible hose assemblies, and in particular to a new and improved flexible hose assembly for a mercury line for a mercury manometer.

Precision mercury manometers are shown in U.S. Pat. Nos. 3,225,599 and 3,296,867. These instruments utilized a flexible line several feet in length which line is filled with mercury. The instrument is adversely affected by leakage of mercury, and therefore the flexible line and its fittings should be leakproof. In a conventional instrument, the line and its fittings are required to pass a leak test at $5 \times 10^{-9}$. While it is relatively easy to obtain flexible hose which will meet this requirement over the operating life of the instrument, problems are encountered in the joining of the hose to the hose fittings by which the hose is interconnected with the components of the instrument.

The leakage test requirement referred to herein is a leak rate of less than $5 \times 10^{-9}$ standard cubic centimeters of test gas per second, which typically is measured with a Hastings calibrated gas leak instrument. This rate is essentially zero leakage for most situations.

In a typical instrument, the flexible hose is formed of a convoluted metal covered by a protective woven metal braid, with a fitting welded to the hose at each end. All mercury line components usually are stainless steel. In one prior art arrangement, a helical hose with a covering braid is provided with a sleeve at the hose end, with the sleeve, braid and hose being welded to the end of the fitting. Obtaining a satisfactory weld which will pass the leak test and also operate satisfactorily during the life of the instrument has been very difficult. Unless the amount of heat is very carefully controlled during the welding operation, portions of the hose adjacent the weld can be damaged and the assembly will not meet the leakage requirement.

In another prior art item utilizing a circular convoluted hose, the fitting has an end and also a welding section spaced from the end. The fitting end is welded to the hose end. Then the braid over the hose and a sleeve over the braid are welded to the welding section of the fitting in a separate operation. This arrangement has been satisfactory with circulated convoluted hose but has not worked well with helical convoluted hose.

SUMMARY OF THE INVENTION

It is an object of the present invention to provide a new and improved flexible hose assembly for a mercury line and a method of producing such a hose assembly, which can be used with presently available convoluted tubing, particularly with helical tubing, in flexible hose assemblies, and which will meet the leak rate requirements on a long term basis. Another object is to provide such an assembly which is easier to weld and which will result in a decrease in the rejection rate of welded components. Other objects, advantages, features and results will most fully appear in the course of the following description.

The flexible hose assembly of the invention includes a length of convoluted hose with an end, an inner sleeve positioned over the hose with a sleeve end welded to the hose end, a hose fitting with the fitting end welded to the inner sleeve, a protective braid position over the hose and inner sleeve, and an outer sleeve positioned over the braid with a sleeve end welded to the braid end and to the fitting at a welding section spaced from the fitting end.

The invention also includes the method of producing the flexible hose assembly as described above.

In the preferred embodiment, a helical tubing is utilized and a plurality of convolutions of the tubing are compressed at the hose end for the welding operations.

BRIEF DESCRIPTION OF THE DRAWINGS

FIG. 1 is a side view, partly in section, illustrating the presently preferred embodiment of the invention;

FIGS. 2-6 are views similar to that of FIG. 1 illustrating steps in the manufacture of the hose assembly of FIG. 1.

DESCRIPTION OF THE PREFERRED EMBODIMENT

Figure 7:
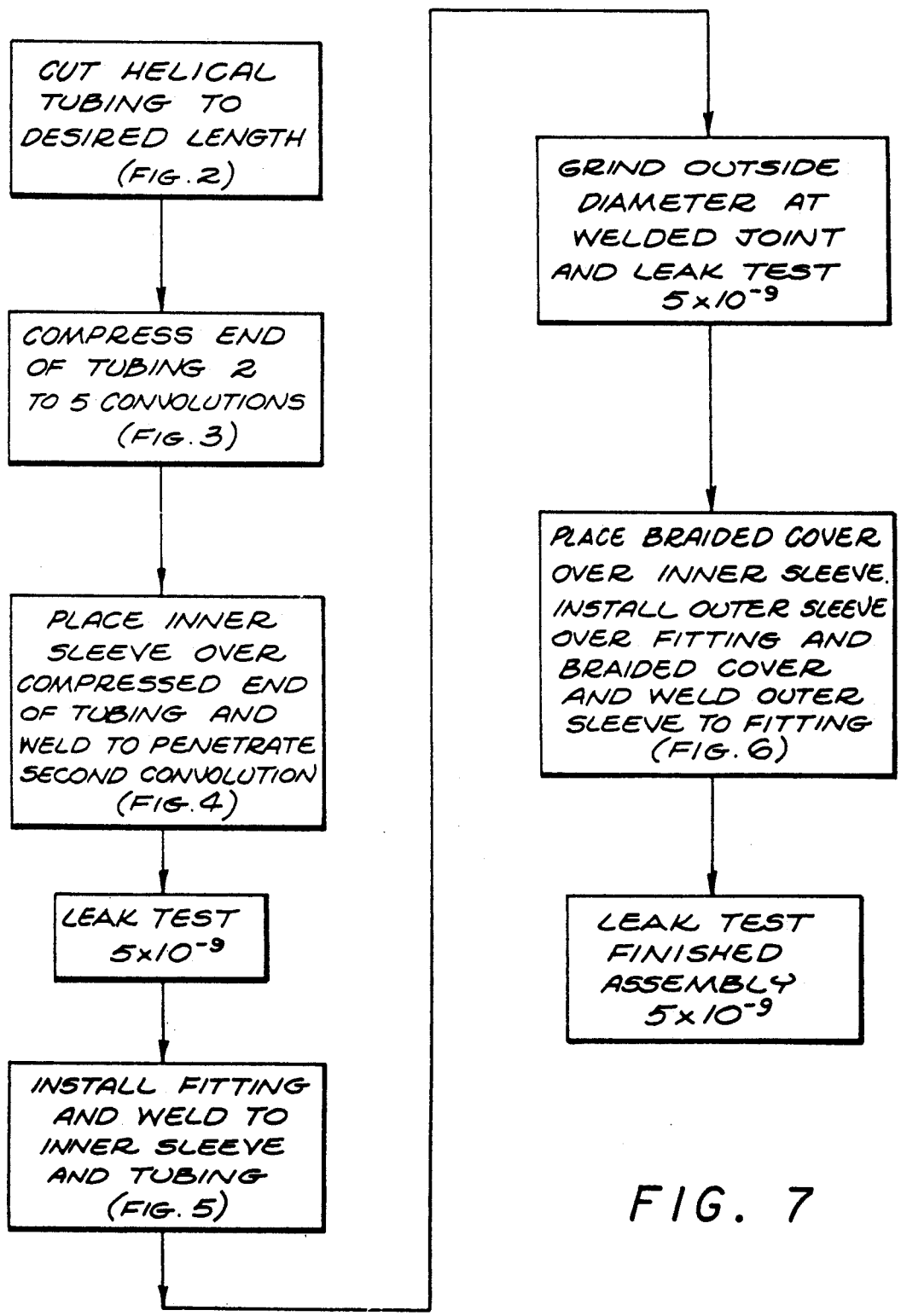
FIG. 7 is a block diagram setting out the steps in the manufacture of the hose assembly.

The hose assembly as shown in the FIG. 1 has a length of flexible tubing 11, an inner sleeve 12, a woven braid 13, a hose fitting 14, and an outer sleeve 15.

The hose or tubing 11 is a flexible convoluted hose, typically of stainless steel. In the preferred embodiment illustrated, this hose is a helical convoluted structure, but also may be a circular convoluted structure. The sleeves 12 and 15 typically are lengths of stainless steel tubing, and the braid 13 is typically woven of stainless steel wire. The fitting 14 typically is of stainless steel, with an outer end 17 of a configuration suitable for connection to another fitting, and with an annular welding section 18 spaced from the inner end 19.

The hose assembly of FIG. 1 is produced in the following manner. A length of hose 11 is cut to the desired size, with an end 21. A number of convolutions of the hose, typically 2 to 5, are compressed together at the end 21, forming a compressed section 22.

The inner sleeve 12 is positioned over the hose, with an end of the sleeve at the end of the hose, and the two components are welded together, producing a weldment 24.

Next the inner end 19 of the fitting 14 is abutted to the weldment 24 and is welded in place, producing another weldment 25. Preferably, this structure is then ground to produce a smooth circular outer surface.

Finally, the braid 13 which has been positioned on the hose and pushed back from the end, is pushed forward into place, and the outer sleeve 15 is positioned over the braid. The end of the braid and the end of the outer sleeve are welded together and to the welding section 18 of the fitting, producing a weldment 26, thus, completing the manufacture of the flexible hose assembly.

Leak testing usually is performed after each of the welding operations. A similar hose assembly is produced at the opposite end of the length of hose, and the hose assembly is now ready for installation into the manometer. The sequence of steps in the manufacturing operation is set out in FIG. 7.

I claim:

1. A method of producing a flexible hose assembly for a mercury line for a manometer, including the steps of:

cutting a length of convoluted helical hose;

axially compressing a plurality of convolutions of said hose at one end thereof such that said compressed convolutions are in contact with each other;

placing an inner sleeve over said hose and said hose end;

welding an end of said inner sleeve to said hose end, thereby producing a first weldment;

providing a hose fitting having a fitting end and a welding section spaced from said fitting end;

welding said fitting end of said hose fitting to said first weldment, thereby producing a second weldment;

placing a braid over said hose and said inner sleeve;

placing an outer sleeve over said braid, said inner sleeve, and said hose end; and welding an end of said outer sleeve to an end of said braid and to said fitting weld section.

2. A method as defined in claim 1 including the step of grinding said second weldment to a predetermined diameter.

3. A method as defined in claim 1 including maintaining the outside diameter of said hose end substantially the same as that of said hose.

* * * * *